United States Patent
Ogino

(10) Patent No.: US 11,848,439 B2
(45) Date of Patent: *Dec. 19, 2023

(54) ELECTRODE FOR LITHIUM-ION SECONDARY BATTERY AND MANUFACTURING METHOD THEREOF, AND LITHIUM-ION SECONDARY BATTERY

(71) Applicant: SEMICONDUCTOR ENERGY LABORATORY CO., LTD., Atsugi (JP)

(72) Inventor: Kiyofumi Ogino, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 408 days.

This patent is subject to a terminal disclaimer.

(21) Appl. No.: 17/121,348

(22) Filed: Dec. 14, 2020

(65) Prior Publication Data

US 2021/0210744 A1    Jul. 8, 2021

Related U.S. Application Data

(60) Continuation of application No. 15/965,189, filed on Apr. 27, 2018, now Pat. No. 10,873,072, which is a (Continued)

(30) Foreign Application Priority Data

Aug. 9, 2013    (JP) ................................ 2013-166869

(51) Int. Cl.
*H01M 4/134* (2010.01)
*H01M 4/62* (2006.01)
(Continued)

(52) U.S. Cl.
CPC ......... *H01M 4/134* (2013.01); *H01M 4/0404* (2013.01); *H01M 4/1395* (2013.01);
(Continued)

(58) Field of Classification Search
None
See application file for complete search history.

(56) References Cited

U.S. PATENT DOCUMENTS 7,179,561 B2    2/2007    Niu et al.
7,572,542 B2    8/2009    Naoi
(Continued)

FOREIGN PATENT DOCUMENTS

JP    06-060870 A    3/1994
JP    2001-283834 A    10/2001
(Continued)

OTHER PUBLICATIONS

Kang.B et al., "Battery Materials for Ultrafast Charging and Discharging", Nature, Mar. 12, 2009, vol. 458, No. 7235, pp. 190-193.
(Continued)

*Primary Examiner* — Tracy M Dove
(74) *Attorney, Agent, or Firm* — NIXON PEABODY LLP; Jeffrey L. Costellia

(57) ABSTRACT

A highly reliable electrode for a lithium-ion secondary battery is provided. A highly reliable lithium-ion secondary battery is also provided using the electrode for a lithium-ion secondary battery. The electrode for a lithium-ion secondary battery includes a current collector and an active material layer. The active material layer includes an active material, graphene, and polyimide. The active material includes a plurality of nanowires each of which grows with a silicon particle used as a nucleus and extends in one direction into a fine needle. The graphene includes a region in contact with the plurality of nanowires, and polyimide includes a region
(Continued)

in contact with the graphene. The lithium-ion secondary battery uses the electrode as a negative electrode.

17 Claims, 6 Drawing Sheets

Related U.S. Application Data division of application No. 14/452,848, filed on Aug. 6, 2014, now abandoned.

(51) Int. Cl.
| | |
|---|---|
| *H01M 4/38* | (2006.01) |
| *H01M 4/1395* | (2010.01) |
| *H01M 4/04* | (2006.01) |
| *H01M 10/0525* | (2010.01) |
| *H01M 4/66* | (2006.01) |

(52) U.S. Cl.
CPC .......... *H01M 4/386* (2013.01); *H01M 4/622* (2013.01); *H01M 4/625* (2013.01); *H01M 4/661* (2013.01); *H01M 4/667* (2013.01); *H01M 10/0525* (2013.01); *Y02T 10/70* (2013.01)

(56) References Cited

U.S. PATENT DOCUMENTS

| | | | |
|---|---|---|---|
| 7,745,047 B2 | 6/2010 | Zhamu et al. | |
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,278,011 B2 | 10/2012 | Zhu et al. | |
| 9,487,880 B2 | 11/2016 | Takahashi et al. | |
| 9,548,489 B2 | 1/2017 | Abdelsalam et al. | |
| 2007/0009799 A1 | 1/2007 | Zheng | |
| 2007/0131915 A1 | 6/2007 | Stankovich et al. | |
| 2008/0048153 A1 | 2/2008 | Naoi | |
| 2008/0254296 A1 | 10/2008 | Handa et al. | |
| 2009/0087723 A1 | 4/2009 | Inda | |
| 2009/0110627 A1 | 4/2009 | Choi et al. | |
| 2009/0117467 A1 | 5/2009 | Zhamu et al. | |
| 2009/0123850 A1 | 5/2009 | Takeuchi et al. | |
| 2009/0253045 A1 | 10/2009 | Kotato et al. | |
| 2009/0305135 A1 | 12/2009 | Shi et al. | |
| 2010/0081057 A1 | 4/2010 | Liu et al. | |
| 2010/0143798 A1 | 6/2010 | Zhamu et al. | |
| 2010/0176337 A1 | 7/2010 | Zhamu et al. | |
| 2010/0233538 A1 | 9/2010 | Nesper et al. | |
| 2010/0233546 A1 | 9/2010 | Nesper et al. | |
| 2010/0248034 A1 | 9/2010 | Oki et al. | |
| 2010/0297502 A1 | 11/2010 | Zhu et al. | |
| 2010/0301279 A1 | 12/2010 | Nesper et al. | |
| 2010/0308277 A1 | 12/2010 | Grupp | |
| 2010/0330421 A1 | 12/2010 | Cui et al. | |
| 2011/0012067 A1 | 1/2011 | Kay | |
| 2011/0111303 A1 | 5/2011 | Kung et al. | |
| 2011/0121240 A1 | 5/2011 | Amine et al. | |
| 2011/0159372 A1 | 6/2011 | Zhamu et al. | |
| 2011/0229795 A1 | 9/2011 | Niu et al. | |
| 2012/0045692 A1 | 2/2012 | Takemura et al. | |
| 2012/0058397 A1 | 3/2012 | Zhamu et al. | |
| 2012/0088151 A1 | 4/2012 | Yamazaki et al. | |
| 2012/0088156 A1 | 4/2012 | Nomoto et al. | |
| 2012/0100402 A1 | 4/2012 | Nesper et al. | |
| 2013/0212879 A1 | 8/2013 | Ogino | |
| 2014/0004412 A1 | 1/2014 | Ogino | |
| 2015/0004488 A1 | 1/2015 | Abdelsalam et al. | |
| 2015/0044571 A1 | 2/2015 | Abdelsalam et al. | |

FOREIGN PATENT DOCUMENTS

| | | |
|---|---|---|
| JP | 2006-265751 A | 10/2006 |
| JP | 2009-524567 | 7/2009 |
| JP | 2009-176721 A | 8/2009 |
| JP | 2011-503804 | 1/2011 |
| JP | 2011-048992 A | 3/2011 |
| JP | 2011-517053 | 5/2011 |
| JP | 2012-527735 | 11/2012 |
| JP | 2013-129913 A | 7/2013 |
| WO | WO-2006/062947 | 6/2006 |
| WO | WO-2006/071076 | 7/2006 |
| WO | WO-2007/061945 | 5/2007 |
| WO | WO-2009/061685 | 5/2009 |
| WO | WO-2009/127901 | 10/2009 |
| WO | WO-2009/144600 | 12/2009 |
| WO | WO-2010/135446 | 11/2010 |
| WO | WO-2013/114094 | 8/2013 |
| WO | WO-2013/114095 | 8/2013 |

OTHER PUBLICATIONS

Padhi.A et al., "Phospho-olivines as Positive-Electrode Materials for Rechargeable Lithium Batteries", J. Electrochem. Soc. (Journal of the Electrochemical Society), Apr. 1, 1997, vol. 144, No. 4, pp. 1188-1194.

Zhou.X et al., "Graphene modified LiFePO4 cathode materials for high power lithium ion batteries", J. Mater. Chem. (Journal of Materials Chemistry), 2011, vol. 21, pp. 3353-3358.

Zhao.X et al., "In-Plane Vacancy-Enabled High-Power Si-Graphene Composite Electrode for Lithium-Ion Batteries", Advanced Energy Materials, 2011, vol. 1, pp. 1079-1084.

Paek.S et al., "Enhanced Cyclic Performance and Lithium Storage Capacity of SnO2/Graphene Nanoporous Electrodes with Three-Dimensionally Delaminated Flexible Structure", Nano Letters, 2009, vol. 9, No. 1, pp. 72-75.

Wang.G et al., "Sn/graphene nanocomposite with 3D architecture for enhanced reversible lithium storage in lithium ion batteries", J. Mater. Chem. (Journal of Materials Chemistry), 2009, vol. 19, No. 44, pp. 8378-8384.

Wang.D et al., "Self-Assembled TiO2-Graphene Hybrid Nanostructures for Enhanced Li-Ion Insertion", ACS Nano, 2009, vol. 3, No. 4, pp. 907-914.

Su.F et al., "Flexible and planar graphene conductive additives for lithium-ion batteries", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors", Nano Letters, 2011, vol. 11, No. 7, pp. 2905-2911.

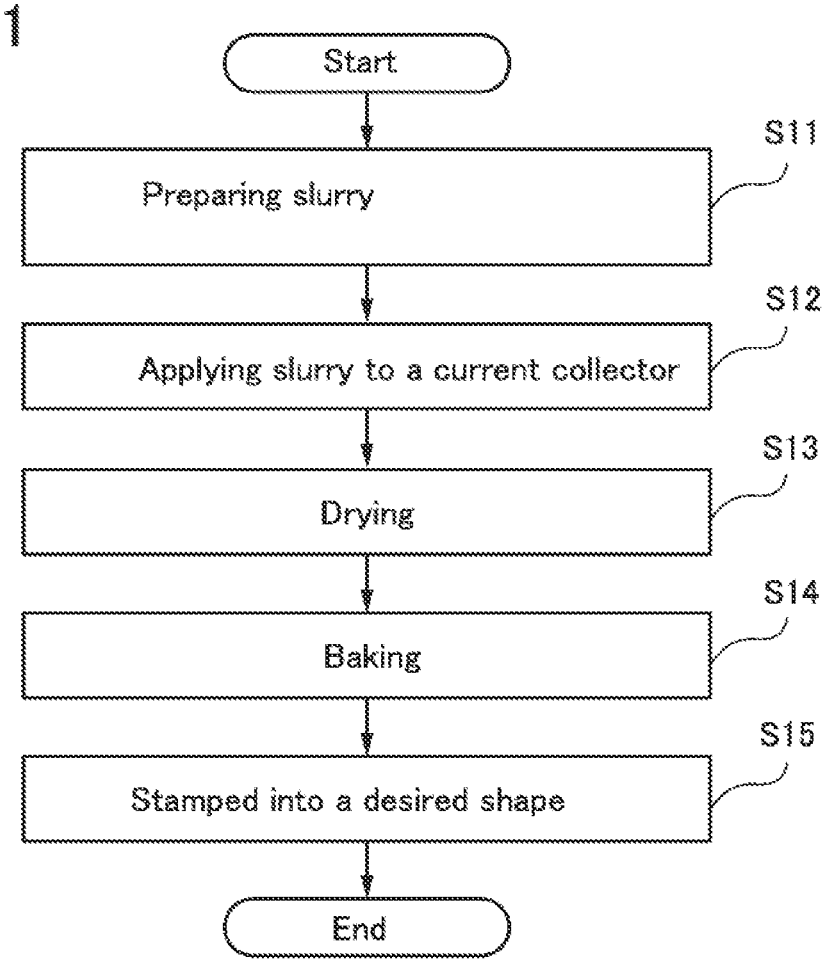

ELECTRODE FOR LITHIUM-ION SECONDARY BATTERY AND MANUFACTURING METHOD THEREOF, AND LITHIUM-ION SECONDARY BATTERY

BACKGROUND OF THE INVENTION

1. Field of the Invention

The present invention relates to an object, a method, or a manufacturing method. In addition, the present invention relates to a process, a machine, manufacture, or a composition of matter. In particular, one embodiment of the present invention relates to a power storage device, a driving method thereof, or a manufacturing method thereof. More particularly, one embodiment of the present invention relates to an electrode for a lithium-ion secondary battery, a manufacturing method thereof, and a lithium-ion secondary battery.

2. Description of the Related Art

In recent years, portable electronic devices such as smartphones and tablets have spread rapidly. Also with growing interest in the environment, hybrid cars and electric cars have attracted attention, thereby increasing the importance of secondary batteries typified by lithium-ion secondary batteries.

The basic structure of a secondary battery includes a positive electrode, a negative electrode, and an electrolyte (an electrolyte solution or a solid electrolyte) provided therebetween. Typically, the positive electrode and the negative electrode each include a current collector and an active material provided over the current collector. In the case of a lithium-ion secondary battery, a material capable of receiving and releasing lithium ions is used as an active material fora positive electrode and a negative electrode.

A negative electrode used in such a secondary battery (hereinafter referred to as a "negative electrode for a secondary battery") is manufactured in such a manner that a layer containing an active material (hereinafter referred to as an "active material layer") is formed over a surface of a current collector. A conventional material used as a negative electrode active material is black lead which can receive and release ions serving as carriers (hereinafter referred to as "carrier ions"). That is, the negative electrode is fabricated as follows: black lead which is a negative electrode active material, carbon black as a conductive additive, and a resin as a binder are mixed to form slurry, and the slurry is applied to a current collector and dried.

In contrast, in the case where silicon or silicon doped with phosphorus or boron is used as a negative electrode active material, carrier ions about four times as much as those in the case of using carbon can be received, and the theoretical capacity of a silicon negative electrode is 4200 mAh/g, which is significantly higher than that of a carbon (black lead) negative electrode, 372 mAh/g. For this reason, silicon is an optimal material for increasing the capacity of a secondary battery, and secondary batteries using silicon as a negative electrode active material have been actively developed in order to increase the capacity.

However, an increase in the number of received carrier ions increases the amount of change in the volume of silicon due to reception and release of carrier ions in charge and discharge cycles, resulting in lower adhesion between a current collector and silicon and deterioration of battery characteristics due to charge and discharge. Furthermore, in some cases, silicon is deformed and broken to be separated or pulverized, which causes a serious problem of a battery malfunction.

In view of this, the following way has been proposed: a layer containing silicon is formed over a negative electrode current collector and a layer containing graphite is formed over the layer containing silicon so that expansion and contraction of the layer containing silicon influences less on degradation of battery characteristics (see Patent Document 1).

REFERENCE

Patent Document

Patent Document 1 Japanese Published Patent Application No. 2001-283834

SUMMARY OF THE INVENTION

However, in Patent Document 1, regardless of whether a negative electrode active material layer has a columnar shape or a powder form, when charge and discharge are repeated more than 10 cycles as described in the document, expansion and contraction of the volume cannot be avoided as long as the negative electrode active material receives and releases carrier ions. Therefore, deformation and breakage of the negative electrode active material layer cannot be prevented, so that the reliability of a battery is difficult to maintain.

In particular, in the case where silicon in the form of a columnar structure body is used as a negative electrode active material, the columnar structure body might be separated from a current collector in repeated charge and discharge, and the charge and discharge capacity and the discharge rate might be significantly reduced with an increase in the number of cycles. This is because of expansion and contraction of a entire columnar structure body.

In view of the above problems, an object of one embodiment of the present invention is to provide a Highly reliable electrode for a lithium-ion secondary battery. Another object is to provide a highly reliable lithium-ion secondary battery with use of flic electrode for a lithium-ion secondary battery. Still another object is to provide a novel power storage device.

An object of one embodiment of the present invention is to achieve at least one of the aforementioned objects.

One embodiment of the present invention is an electrode including a current collector and an active material layer. The active material layer includes an active material, graphene, and polyimide. The active material includes a plurality of nanowires each of which grows with a silicon particle used as a nucleus and extends in one direction into a fine needle. The graphene includes a region in contact with the plurality of nanowires, and polyimide includes a region in contact with the graphene.

Graphene refers to a one-atom-thick sheet of carbon molecules having $sp^2$ bonds. Graphene includes single-layer graphene and multilayer graphene. Graphene may contain oxygen at a concentration of 2 atomic % to 11 atomic %, preferably 3 atomic % to 10 atomic %.

One embodiment of the present invention is a lithium-ion secondary battery including at least a positive electrode and a negative electrode. The negative electrode includes a negative electrode current collector and a negative electrode active material layer. The negative electrode active material layer includes a negative electrode active material, a first graphene, and polyimide. The negative electrode active material includes a plurality of nanowires each of which grows with a silicon particle used as a nucleus and extends in one direction into a fine needle. The first graphene includes a region in contact with the plurality of nanowires and polyimide includes a region in contact with the first graphene. The positive electrode includes a positive electrode current collector and a positive electrode active material layer. The positive electrode active material layer includes a positive electrode active material, a second graphene, and polyvinylidene fluoride. The second graphene includes a region in contact with the positive electrode active material.

One embodiment of the present invention is a method for manufacturing an electrode for a lithium ion secondary battery, which includes the steps of mixing silicon particles and graphene oxide; mixing the mixture of silicon particles and graphene oxide with a mixed solution of a polyimide precursor and a polar solvent, thereby obtaining slurry; and applying the slurry to a current collector and then performing baking. As a result, a nanowire grows with a silicon panicle used as a nucleus and extends in one direction into a fine needle, graphene oxide is reduced to graphene, and the polyimide precursor is imidized to be polyimide.

According to one embodiment of the present invention, deformation and breakage of silicon can be prevented even when the volume of silicon changes with reception and release of carrier ions, resulting in increased reliability of an electrode for a lithium-ion secondary battery. In addition, a lithium-ion secondary battery including the electrode can have improved reliability.

BRIEF DESCRIPTION OF THE DRAWINGS

In the accompanying drawings.

FIG. J illustrates a method for manufacturing an electrode for a lithium-ion secondary battery.

DETAILED DESCRIPTION OF THE INVENTION

Figure 2A:
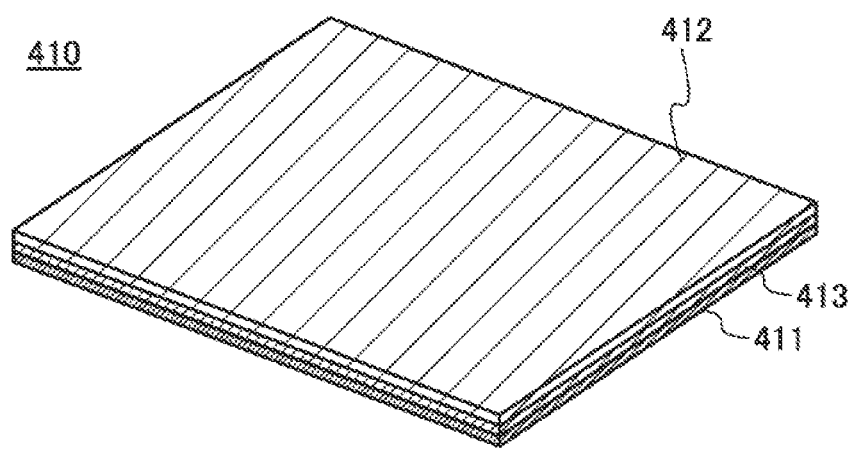
FIGS. 2A and 2B illustrate a negative electrode.

Hereinafter, embodiments and example will be described with reference to drawings. Note that the embodiments and the example can be implemented in many different modes, and it will be readily appreciated by those skilled in the an that modes and details thereof can be changed in various ways without departing from the spirit and scope of the present invention. Thus, the present invention should not be interpreted as being limited to the following descriptions of the embodiments and the example.

Note that in the structures of the present invention described below, the same portions or portions having similar functions are denoted by the same reference numerals in different drawings, and description thereof is not repeated. Furthermore, the same hatching pattern is used to denote portions having similar functions, and the portions are not especially denoted by reference numerals in some cases.

Embodiment 1

In this embodiment, a method for manufacturing an electrode for a lithium-ion secondary battery of one embodiment of the present invention will be described with reference to FIG. 1.

FIG. 1 is a flowchart showing the method for manufacturing an electrode for a lithium-ion secondary battery of one embodiment of the present invention. First, an active material, a conductive additive, and a hinder are prepared. In this embodiment, silicon, graphene, and polyimide are used as the active material, the conductive additive, and the binder, respectively.

First, as shown in step S11, silicon particles, graphene oxide, a polyimide precursor, and a polar solvent are mixed to prepare slurry. In this embodiment, silicon:graphene oxide:polyimide=40:40:20 (wt %) is satisfied.

Silicon particles are used as silicon. Silicon particles preferably have an average diameter of 10 nm to 1 μm.

Silicon is mixed with the polar solvent first. As the polar solvent, NMP (also referred to as N-methylpyrrolidone, 1-methyl-2-pyrrolidene, or N-methyl-2-pyrrolidone), dimethylformamide, or the like can be used. In this embodiment, NMP is used as the polar solvent.

Then, graphene oxide and NMP are added to the mixture of silicon particles and NMP and further mixed.

In the case where graphene is used as the conductive additive, it Ls preferable to use reduced graphene oxide (RGO) obtained by reducing graphene oxide. Graphene oxide can be produced by a Hummers method, a modified Hummers method, or the like. Note that the method for forming an electrode for a lithium-ion secondary battery of one embodiment of the present invention is not limited by the degree of separation of graphene oxide.

For example, in the Hummers method, graphite such as flake graphite is oxidized to give graphite oxide. Obtained graphite oxide is graphite that is oxidized in places and thus to which a functional group such as an epoxy group, a carbonyl group, a carboxyl group, or a hydroxyl group is bonded. In the graphite oxide, the crystallinity of graphite is lost and the distance between layers is increased. Therefore, graphene oxide can be easily obtained by separation of the layers from each other by ultrasonic treatment or the like.

The length of one side (also referred to as a flake size) of the graphene oxide is greater than or equal to 50 nm and less than or equal to 100 μm, preferably greater than or equal to 800 nm and less than or equal to 20 μm. In the case where the flake size is smaller than the average diameter of active material particles, the surface contact with the active material particles and the connection between graphene flakes are less likely to be made, resulting in difficulty in increasing the electric conductivity of an active material layer.

As the average diameter of silicon particles decreases, the particles have higher cohesive energy and thus are less likely to be dispersed uniformly in slurry. This produces locally a dense area where silicon panicles are aggregated and a sparse area where silicon particles are not aggregated, resulting in reduced proportion of active materials contributing to electron conduction.

Graphene or reduced graphene is less likely to be dispersed in slurry than graphene oxide; therefore, the use of graphene or reduced graphene in the production of slurry causes aggregation of graphene in the slurry. This is because graphene or reduced graphene has no functional group contributing to dispersion in the slurry. The aggregation of graphene tends to interrupt the formation of the conductive path with an active material, reducing the proportion of active materials contributing to electron conduction. Hence, in the area of an electrode where aggregated silicon particles are not m contact with graphene, silicon does not contribute to the discharge capacity of a battery.

In view of the above, to prevent the aggregation of silicon particles and the aggregation of graphene oxide, silicon and graphene oxide are preferably mixed using a polar solvent so that a thick paste is obtained. Oxygen in the functional group in graphene oxide is negatively charged in a polar solvent; hence, aggregation of graphene oxide is less likely to occur but graphene oxide strongly interacts with the polar solvent such as NMP. Thus, the functional group such as an epoxy group in the graphene oxide interacts with the polar solvent, which probably prevents aggregation of graphene oxide, resulting in uniform dispersion of graphene oxide in slurry.

Next, a binder is added to the mixture of silicon particles and graphene oxide. The binder is added to the mixture in which graphene oxide is uniformly dispersed to be in contact with a plurality of silicon particles; as a result, graphene oxide can be bonded to the silicon particles while maintaining the dispersed state. The binder is not necessarily added depending on the compounding ratio between silicon and graphene oxide; however, the addition of the binder increases the strength of the electrode.

As the binder, polyvinyldene fluoride (PVDF) as well as polyimide can be used, for example. Note that the binder added in this step is a mixed solution of a polyimide precursor and a polar solvent (e.g., NMP), and the polyimide precursor is imidized to be polyimide by a baking process in step S14. The mixed solution of the polyimide precursor and the polar solvent has a pH of 2 to 4.

Then, a polar solvent is added to the mixture until the mixture has predetermined viscosity and the polar solvent and the mixture am mixed; thus, the slurry can be prepared. In this step, the mixing and the addition of the polar solvent may be repeated more than once.

Through the above steps, the slurry in which the active material, graphene oxide, and the binder are uniformly dispersed can be obtained.

In the preparation of the slurry in this embodiment, the compounding ratio of the active material to graphene oxide and the binder is 40:40:20; however, one embodiment of the present invention is not limited hereto. For example, the compounding ratio of silicon particles to graphene oxide and polyimide may be 30:20:50 to 95:1:4. Alternatively, the compounding ratio can be changed as appropriate in the following range: 30% to 95% of silicon particles: 1% to 50% of graphene oxide; and 4% to 60% of polyimide.

Then, as shown in step S12, the slurry is provided on either or both sides of a current collector. The slurry can be provided by a roll coating method using an applicator roll or the like, a screen printing method, a doctor blade method, or a coating method such as a spin coating method or a bar coating method.

The current collector can be formed using a material that has high electric conductivity and is not alloyed with a carrier ion of lithium or the like, such as a metal typified by stainless steel, iron, copper, titanium, and nickel, or an alloy thereof.

Note that an undercoat may be applied to the current collector before the slurry is provided on the current collector. The application of the undercoat to the current collector reduces the interface resistance between the current: collector and an active material layer formed later, and/or increases the adhesion between the active material layer and the current collector. Note that if there is no problem with the adhesion between the current collector and the active material layer, the electrode strength, and the interface resistance between the current collector and the electrode, it is not necessary to apply the undercoat to the current collector.

Next, as shown in step S13, the slurry formed over the current collector is dried by a method such as ventilation diving or reduced pressure (vacuum) drying to form the active material layer. The drying is preferably performed using a hot wind with temperatures of 50° C. to 180° C., for example, at 80° C. for two hours. Through this step, the polar solvent contained in the active material layer is evaporated. Note that there is no particular limitation on the atmosphere.

The active material layer may be pressed by a compression method such as a roll press method or a flat plate press method to be consolidated. When the pressing is performed while being heated at higher than or equal to 90° C. and lower than or equal to 180° C. preferably lower than or equal to 120° C. the binder (e.g., polyimide) contained in the undercoat or the active material layer is softened to such an extent that the characteristics of the electrode is not changed, further increasing the adhesion between the current collector and the active material layer.

Next, as shown in step S14, the electrode with the dried slurry is baked.

The baking of the electrode with the dried slurry is preferably performed in a vacuum furnace. For example, the degree of vacuum in the vacuum furnace is preferably $2 \times 10^{-2}$ [Pa].

The electrode with the dried slurry is preferably baked at temperatures gradually increasing to the maximum temperature, which can be determined depending on the upper temperature limit of the binder. In this embodiment, the maximum temperature is, for example, higher than or equal to 360° C. and lower than or equal to 400° C. at which the polyimide precursor is imidized. For example, the dried electrode is baked as follows: the temperature is raised from room temperature to approximately 100° C. and baking is performed for a certain period; the temperature is raised from approximately 100° C. to approximately 200° C. and baking is performed for a certain period; the temperature is raised from approximately 200° C. to approximately 250° C. and baking is performed for a certain period; and the temperature is raised from approximately 250° C. to approximately 370° C. and baking is performed for a certain period. Lastly, the temperature is lowered to room temperature.

The baking of the electrode produces a nanowire that grows with a silicon particle used us a nucleus and extends in one direction into a fine needle. The nanowire has a diameter of approximately several nanometers to several tens of nanometers and a length of several micrometers to several tens of micrometers. The silicon nanowire grows with a silicon particle as a nucleus; accordingly, the diameter of the silicon nanowire is smaller than that of the silicon particle in some cases. In addition, generated nanowires are tangled, so that a network of silicon nanowires is obtained. It is thus possible to produce an active material including a plurality of nanowires each of which grows with a silicon particle used as a nucleus and extends in one direction into a fine needle. Note that silicon particles used as nuclei of nanowires may be locally clumped or aggregated.

In the case where silicon particles am used as an active material, the silicon particles expand and contract in all directions when silicon receives and releases carrier ions. This easily causes deformation and breakage of silicon particles, thereby making it difficult to maintain the reliability of the electrode. The deformation and breakage of silicon particles produces another film on the surface of silicon particles, and irreversible capacity is generated by the film, as a result, part of discharge capacity is lost. When the lithium-ion secondary battery is repeatedly charged and discharged in that state, the capacity is reduced. The reduction in capacity due to the repeated charge and discharge leads to a reduced charge-discharge efficiency of the lithium-ion secondary battery.

In contrast, a silicon nanowire tends to expand in the direction of the diameter but not to expand in the direction of the axis even when the silicon nanowire receives and releases lithium. In other words, a change in the volume of the silicon nanowire in expansion and contraction is direction dependent, therefore, silicon deformation and breakage is not likely to occur, leading to improved reliability of the electrode. Furthermore, another film is prevented from being formed on the surface of silicon particles, which inhibits generation of irreversible capacity and a reduction in discharge capacity. A reduction in the capacity of the lithium-ion secondary battery can also prevented, thereby increasing the charge-discharge capacity of the lithium-ion secondary battery.

In the baking of the electrode, graphene can be formed by reducing graphene oxide. Here, oxygen in graphene oxide is not necessarily entirely extracted and may remain partly in the graphene. In the case where graphene contains oxygen, the proportion of oxygen in the graphene measured by XPS is higher than or equal to 2 atomic % and lower than or equal to 20 atomic %, preferably higher than or equal to 3 atomic % and lower than or equal to 15 atomic %. Because graphene oxide is uniformly dispersed in the slurry, reduced graphene is also uniformly dispersed in the active material of the electrode. The graphene is formed so as to cover the nanowires that grow with silicon particles as nuclei and are tangled. The graphene has a planar shape and therefore touches a large area of the tangled nanowires. This reduces the contact resistance between the nanowires and the graphene to reduce the resistance of the electrode.

Furthermore, in the baking of the electrode, a polyimide precursor is imidized to be polyamide. The polyimide precursor is added while graphene oxide is uniformly dispersed to be in contact with a plurality of silicon particles in the production of the slurry. Hence, after the baking of the electrode, the tangled nanowires are covered with graphene and polyimide is further provided to maintain that state. Accordingly, deformation and breakage of silicon can be further prevented even when the nanowires expand and contract.

The baking of the electrode cannot be performed at temperatures higher than or equal to the upper temperature limit of the binder. For example, in the case where PVDF is used as a binder, the baking of the electrode needs to be performed at temperatures lower than 170° C. In the case where the baking of the electrode is performed at temperatures lower than 170° C., the electrode needs to be heated for at least ten hours in order to reduce graphene oxide sufficiently. In contrast, when polyimide is used as a binder, heat treatment can be performed at a higher temperature than that in the case of using PVDF because a polyimide precursor is imidized at 270° C. to 400° C. In addition, graphene oxide can be reduced in a shorter time than that in the case of using PVDF.

In one embodiment of the present invention, production of nanowires using silicon particles as nuclei, reduction of graphene oxide to produce graphene, and imidization of a polyimide precursor can be performed in the step of baking slurry. As a result, the number of production steps can be reduced in the manufacture of electrodes.

Lastly, as shown in step S15, the baked electrode is stamped into a desired shape, whereby an electrode for a lithium-ion secondary battery is completed.

In the flowchart of FIG. 1, the reduction of graphene oxide and the baking of the electrode are performed at the same time; however, one embodiment of the present invention is not limited to this case. For example, after the drying step of the electrode in step S13, graphene may be produced by chemical reduction of graphene oxide, and then the electrode may be baked. In this specification and the like, chemical reduction of graphene oxide refers to reduction by a chemical reaction using a reducing agent.

With reaction of graphene oxide using a reducing solution, the graphene oxide included in the active material layer is reduced to graphene. This reduction treatment is preferably performed at temperatures of room temperature to 150° C., more preferably at temperatures of room temperature to 80° C. The reduction time of the graphene oxide can be longer than or equal to 3 minutes and shorter than or equal to 10 hours.

Examples of the reducing solution include ascorbic acid, hydrazine, dimethyl hydrazine, hydroquinone, sodium boron hydride ($NaBH_4$), tetra butyl ammonium bromide (TBAB), lithium aluminium hydride ($LiAlH_4$). N,N'-diethylhydroxylamine, and a derivative thereof. For example, ascorbic acid and hydroquinone are preferable to hydrazine and sodium boron hydride in that they are safe owing to low reducing ability and utilized industrially with ease.

A polar solvent can be used as the solvent in the reducing solution. Any material can be used for the polar solvent as long as it can dissolve the reducing agent. Examples of the polar solvent include water, methanol, ethanol, acetone, tetrahydrofuran (THF), dimethylformamide (DMF), N-methyl-2-pyrrolidone (NMP), dimethyl sulfoxide (DMSO), ethylene glycol, diethylene glycol, and glycerin, and a mixed solution of any two or more of the above.

The pH of the reducing solution is, for example, greater than or equal to 4 and less than 11, preferably greater than or equal to 5 and less than or equal to 7. To control the pH of the reducing solution, the reducing solution preferably contains a pH adjuster. Any kind of alkaline solution or alkaline salt can be used as the pH adjuster; for example, sodium hydroxide, potassium hydroxide, calcium hydroxide, lithium hydroxide, ammonium hydroxide, sodium carbonate, potassium carbonate, calcium carbonate, or lithium carbonate can be used.

As the reducing solution, a mixed solution of ethanol and ascorbic acid, or a mixed solution of water, ascorbic acid, and lithium hydroxide can be used.

Protons are added to graphene oxide by ascorbic acid when an active material layer formed over a current collector is soaked in a reducing solution. Then, the graphene oxide is reduced by the release of $H_2O$, whereby graphene is probably formed. The reduction of graphene oxide in the reducing solution can inhibit release of carbon from graphene.

After the chemical reduction, the current collector over which the active material layer is formed is washed and then dried. The washing of the current collector over which the active material layer is formed is preferably performed using a solution given as the solvent contained in the reducing solution. The solution may be either the same as or different from the solvent contained in the reducing solution. The drying is preferably performed in a reduced pressure (vacuum) atmosphere or a reduction atmosphere. For example, this drying step may be performed at temperatures of 50° C. to 200° C. for 1 hour to 48 hours. The drying allows sufficient evaporation or removal of the polar solvent and moisture in the active material layer. The drying step can also facilitate the reduction of graphene oxide.

After that, the electrode is baked, thereby producing nanowires using silicon particles as nuclei, and imidizing polyimide.

Through the above steps, the electrode for a lithium-ion secondary battery of one embodiment of the present invention can be manufactured.

One embodiment of the present invention can be implemented in appropriate combination with any of the other embodiments.

Embodiment 2

In this embodiment, a lithium-ion secondary buttery and a manufacturing method thereof will be described with reference to FIGS. 2A and 2B, FIGS. 3A to 3C, and FIGS. 4A to 4C.

First, a negative electrode that can be used tor a lithium-ion secondary battery will be described with reference to FIGS. 2A and 2B.

Figure 2B:
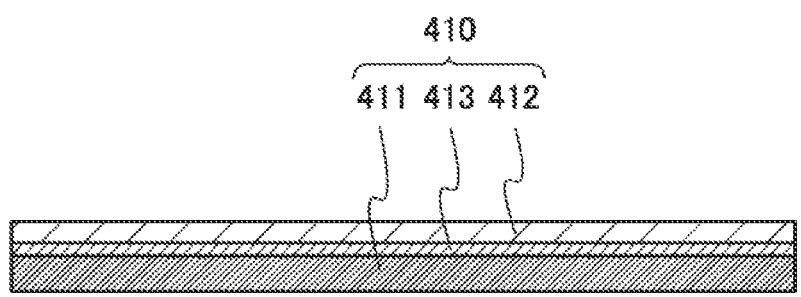

FIG. 2A is a perspective view of a negative electrode 410, and FIG. 2B is a cross-sectional view of the negative electrode 410. The negative electrode 410 includes, for example, a negative electrode current collector 411 and a negative electrode active material layer 412 which is formed over the negative electrode current collector 411 by a coating method, a CVO method, a sputtering method, or the like, FIGS. 2A and 2B illustrate an example where an undercoat 413 is provided between the negative electrode current collector 411 and the negative electrode active material layer 412; however, the undercoat 413 is not necessarily provided. FIG. 2A illustrates an example where the negative electrode active material layer 412 is provided over one surface of the negative electrode current collector 411 with a sheet shape (or a strip-like shape); however, one embodiment of the present invention is not limited to this example. The negative electrode active material layers 412 may be provided so that the negative electrode current collector 411 is sandwiched therebetween. Also in FIG. 2A, the negative electrode active material layer 412 is provided over the whole negative electrode current collector 411; however, the negative electrode active material layer 412 may be provided over part of the negative electrode current collector 411. For example, it is preferable that the negative electrode active material layer 412 not be provided in a portion where the negative electrode current collector 411 is connected to a negative electrode tab.

The negative electrode current collector 411 can be formed using a material that has high electric conductivity and is not alloyed with a carrier ion of lithium or the like, such as a metal typified by stainless steel, iron, copper, titanium, or nickel or an alloy thereof. The negative electrode current collector 411 can have a foil-like shape, a plate-like shape (sheet-like shape), a net-like shape, a punching-metal shape, an expanded-metal shape, or the like as appropriate. The negative electrode current collector 411 preferably has a thickness of 6 μm to 30 μm.

A material with which lithium can be dissolved and precipitated or a material into/from which lithium ions can be inserted and extracted can be used for the negative electrode active material; for example, it is possible to use a lithium metal, a carbon-baaed material, or an alloy-based material as well as the silicon nanowire of one embodiment of the present invention.

In FIG. 2B, the negative electrode active material includes a plurality of nanowires each of which grows with a silicon particle used as a nucleus and extends in one direction into a fine needle. The plurality of nanowires are tangled.

In the case where the negative electrode active material layer 412 is formed by a coating method, as illustrated in FIG. 1, a conductive additive or a binder is added to the negative electrode active material to form a negative electrode paste; and the negative electrode paste is applied to the negative electrode current collector 411 and dried.

The negative electrode active material layer 412 may be predoped with lithium. For the predoping, a lithium layer may be formed on a surface of the negative electrode active material layer 412 by a sputtering method. Alternatively, the negative electrode active material layer 412 can be predoped with lithium by providing lithium foil on the surface of the negative electrode active material layer 412, Examples of the conductive additive include carbon black such as acetylene black (AB) or ketjen black (KB), graphite (black lead) particles, and carbon nanotubes. Here, graphene is used as the conductive additive. Note that graphene also serves as an active material in some cases.

Graphene includes single-layer graphene and multilayer graphene. Graphene has a sheet-like shape with a length of several micrometers.

Single-layer graphene refers to a one-atom-thick sheet of carbon molecules having $sp^2$ bonds and is very thin. Single-layer graphene contains six-membered rings each composed of carbon atoms, which are connected in the planar direction, and poly-membered rings each formed when a carbon-carbon bond in part of a six-membered ring is broken, such as a seven-membered ring, an eight-membered ring, a nine-membered ring, and a ten-membered ring.

Note that the poly-membered ring is composed of carbon and oxygen atoms in some cases. An oxygen atom is sometimes bonded to a carbon atom in the poly-membered ring. In the case where graphene contains oxygen, a carbon bond in part of a six-membered ring is broken, and an oxygen atom is bonded to a carbon atom whose bond is broken, whereby the poly-membered ring is formed. Therefore, the bond of carbon and oxygen has an opening functioning as a path through which ions can transfer. Thus, as the proportion of oxygen included in the graphene is higher, the proportion of the openings each functioning as a path through which ions can transfer is increased.

In the case where graphene contains oxygen, the proportion of oxygen in the graphene measured by XPS is higher than or equal to 2 atomic % and lower than, or equal to 11 atomic %, preferably higher than or equal to 3 atomic % and lower than or equal to 10 atomic %. The conductivity of the graphene increases as the proportion of oxygen is lower. As the proportion of oxygen is higher, more openings serving as paths of ions can be formed in the graphene.

In the case where the graphene is multilayer graphene, the graphene includes plural sheets of single-layer graphene, typically, 2 to 100 sheets of single-layer graphene and is thus very thin. Since the single-layer graphene contains oxygen, the interlayer distance between graphenes is greater than or equal to 0.34 nm and less than or equal to 0.5 nm, preferably greater than or equal to 0.38 nm and less than or equal to 0.42 nm, and more preferably greater than or equal to 0.39 nm and less than or equal to 0.41 nm. In general graphite, the interlayer distance between single-layer graphenes is 0.34 nm. Since the interlayer distance in the graphene is longer than that in general graphite, ions can easily transfer in the direction parallel to a surface of the single-layer graphene. In addition, the graphene contains oxygen and is a single-layer graphene or a multilayer graphene containing poly-membered rings and thus include openings in places. Therefore, in the case where the graphene is multilayer graphene, ions can transfer in the direction parallel to a surface of the single-layer graphene, i.e., through a gap between the single-layer graphenes, and in the direction perpendicular to a surface of the graphene, i.e., through the openings in the single-layer graphenes.

When a surface of the active material is in contact with an electrolyte in a lithium-ion secondary battery, the electrolyte and the active material react with each other, so that a film is formed on the surface of the active material. The film is probably necessary for relieving reaction between the active material and the electrolyte and for stabilization. However, when the thickness of the film is increased, carrier ions are less likely to be inserted in an electrode, leading to a reduction in the conductivity of lithium ions between the active material and the electrolyte and a waste of the electrolyte. In order to solve these problems, the active material (here, nanowires each of which grows with a silicon particle used as a nucleus and extends in one direction into a fine needle) is covered with graphene, thereby preventing an increase in the thickness of the film, a reduction in the conductivity of lithium ions, and a waste of the electrolyte.

It is said that the diffusion coefficient of lithium ions in silicon is approximately $1 \times 10^{-14}$ cm$^2$/sec, which is lower than that in black lead, higher than or equal to $1 \times 10^{-6}$ cm$^2$/sec and lower than or equal to $1 \times 10^{-12}$ cm$^2$/sec. However, black lead used as an active material has a size of several micrometers, lithium ions therefore move a long distance. The silicon nanowire of one embodiment of the present invention has a diameter of several nanometers to several tens of nanometers although having a length of several micrometers to several tens of micrometers. Accordingly, even when the diffusion coefficient is lower than that in black lead, lithium ions move a shorter distance in the silicon nanowire; hence, lithium ions can be inserted and extracted in a shorter time.

Silicon has a lower electric conductivity than carbon, and thus a negative electrode in which silicon is used as an active material has a high resistance. However, because graphene has a high electric conductivity, covering silicon with graphene enables electrons to transfer at a higher speed in the graphene through which lithium ions pass. In addition, graphene has a region in contact with a plurality of silicon nanowires. Because graphene has a thin sheet-like shape, covering the plurality of nanowires with graphene can increase the silicon content in the active material layer and makes transfer of lithium ions easier than in graphite. As a result, the conductivity of lithium ions can be increased, reaction between silicon that is an active material and lithium ions can be increased, and lithium ions can be easily inserted in silicon.

The nanowire, which grows with a silicon particle, a negative electrode active material used as a nucleus and extends in one direction into a fine needle, tends to expand in the direction of the diameter but not to expand in the direction of the axis even when receives lithium. In other words, a change in the volume of the nanowire is direction dependent; therefore, silicon deformation and breakage is not likely to occur, improving the reliability of the electrode. Furthermore, another film is prevented from being formed on the surface of silicon, which prevents generation of irreversible capacity and a reduction in discharge capacity.

In the case where silicon is used as a negative electrode active material, the material of a binder is preferably mechanically strong and elastic because the following is desirable, a negative electrode active material layer maintains its strength even when silicon expands and contracts due to reception and release of lithium in changing and discharging, and the negative electrode active material layer is deformed with a change in the shape of silicon. Polyimide is preferably used as such a binder. In the negative electrode of one embodiment of the present invention, the tangled nanowires are covered with graphene and polyimide is further provided to maintain such a state. Accordingly, polyimide includes a region in contact with at least graphene, and may include a region in contact with silicon nanowires.

By using the aforementioned electrode of one embodiment of the present invention as the negative electrode, the lithium-ion secondary battery can be charged and discharged at a high rate.

Next, a positive electrode that can be used for a lithium-ion secondary battery will be described with reference to FIGS. 3A to 3C.

Figure 3A:
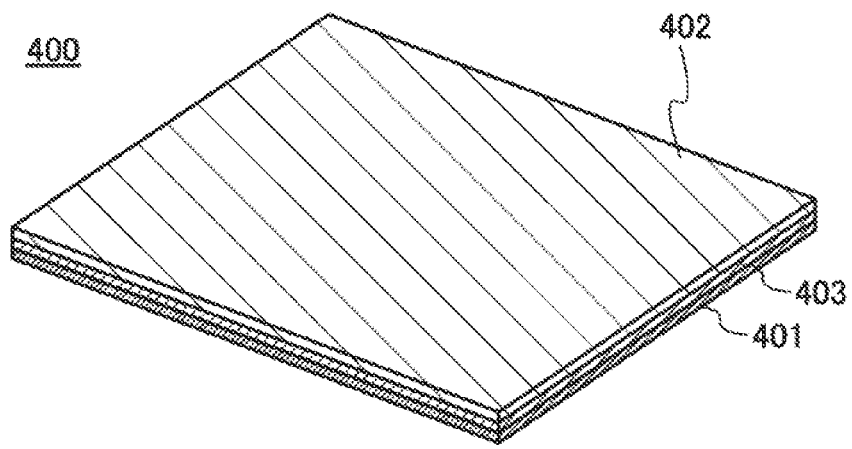
FIGS. 3A to 3C illustrate a positive electrode.
Figure 3B:
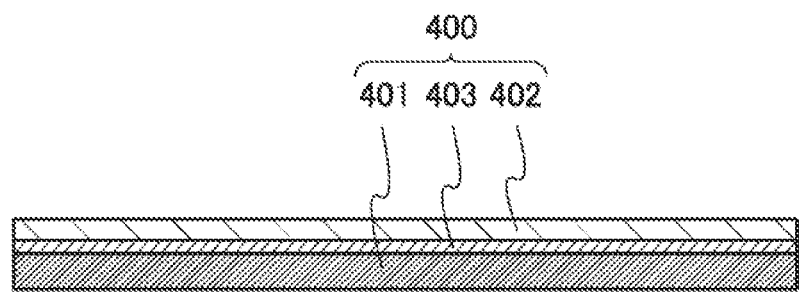

FIG. 3A is a perspective view of a positive electrode 400, and FIG. 3B is a cross-sectional view of the positive electrode 400. The positive electrode 400 includes, for example, a positive electrode current collector 401 and a positive electrode active material layer 402 that is formed over the positive electrode current collector 401 by a coating method, a CVD method, a sputtering method, or the like. An undercoat 403 is provided between the positive electrode current collector 401 and the positive electrode active material layer 402. FIG. 3A illustrates an example where the positive electrode active material layer 402 is provided over one surface of the positive electrode current collector 401 with a sheet shape (or a strip-like shape); however, one embodiment of the present invention is not limited to this example. The positive electrode active material layers 402 may be provided so that the positive electrode current collector 401 is sandwiched therebetween. Also in FIG. 3A, the positive electrode active material layer 402 is provided over the whole positive electrode current collector 401; however, the positive electrode active material layer 402 may be provided over part of the positive electrode current collector 401. For example, it is preferable that the positive electrode active material layer 402 not be provided in a portion where the positive electrode current collector 401 is connected to a positive electrode tab.

The positive electrode current collector 401 can be formed using a material that has high electric conductivity and is not alloyed with a carrier ion of lithium or the like, such as a metal typified by stainless steel, gold, platinum, zinc, iron, copper, aluminum, or titanium, or an alloy thereof. Alternatively, an aluminum alloy to which an element that improves heat resistance, such as silicon, titanium, neodymium, scandium, or molybdenum, is added can be used. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, and nickel. The positive electrode current collector 401 can have a foil-like shape, a plate-like shape (sheet-like shape), a net-like shape, a punching-metal shape, an expanded-metal shape, or the like as appropriate. The negative electrode current collector 401 preferably has a thickness of 10 μm to 30 μm.

Examples of the undercoat include a mixture of acetylene black (AB) and sodium polyacrylate (PAA) and a mixture of AB and PVDF. The compounding ratio of black lead to PAA is preferably 95:5 to 50:50 and the compounding ratio of AB to PVDF is preferably 70:30 to 50:50.

Figure 3C:
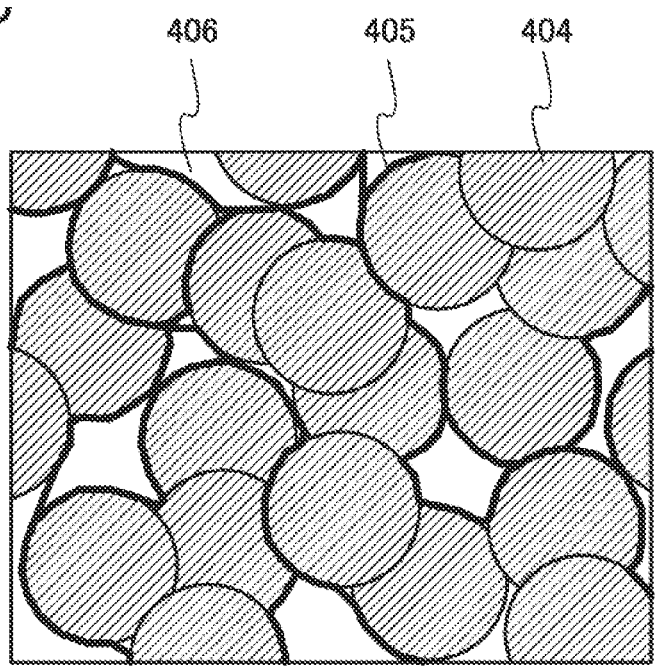

FIG. 3C is a schematic view illustrating a longitudinal cross section of the positive electrode active material layer 402. The positive electrode active material layer 402 includes positive electrode active material particles 404, graphene 405 as a conductive additive, and a binder 406.

Examples of the conductive additive include acetylene black (AB), ketjen black, graphite (black lead) panicles, and carbon nanotubes. Here, the positive electrode active material layer 402 using the graphene 405 is described.

The positive electrode active material particles 404 are made of secondary particles having an average diameter or a particle diameter distribution, which are obtained in such a way that material compounds are mixed at a predetermined ratio and baked and the resulting baked product is crushed, granulated, and classified by an appropriate means. Therefore, the shape of the positive electrode active material particles 404 is not limited to such a spherical shape as is schematically illustrated in FIG. 3C.

The positive electrode active material particles 404 can be made of a material into/from which lithium ions can be inserted and extracted. An example of the material is a compound that contains lithium and oxygen and has an olivine crystal structure, a layered rock-salt crystal structure, or a spinel crystal structure.

An example of an olivine-type compound containing lithium and oxygen is a composite oxide represented by $LiMPO_4$ (general formula) (M is one or more of Fe(II), Mn(II), Co(II), and Ni(II)). Typical examples of $LiMPO_4$ (general formula) include $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<c1), $LiFe_cNi_dCo_ePO_4$, $LiFe_cNi_dMn_ePO_4$, $LiNi_cCo_dMn_ePO_4$ (c+d+e≤1, 0c<1, 0<d<1, and 0<e<1), and $LiFe_fNi_gCo_hMn_iPO_4$ (f+g+h+i≤1.0<f<1, 0<g<1, 0<h<1, and 0<i<1).

$LiFePO_4$ is particularly preferable because it properly has properties necessary for the positive electrode active material, such as safety, stability, high capacity density, high potential, and the existence of lithium ions that can be extracted in initial oxidation (charging).

Examples of a layered rock-salt crystal compound containing lithium and oxygen include lithium cobalt oxide ($LiCoO_2$), $LiNiO_2$, $LiMnO_2$, NiCo-based compound such as $LiNi_{0.8}Co_{0.2}O_2$ (general formula: $LiNi_xCo_{1-x}O_2$ (0<x<1)), NiMn-based compound such as $LiNi_{0.5}Mn_{0.5}O_2$ (general formula $LiNi_xMn_{1-x}O_2$(0<x<1)), NiMnCo-based compound such as $LiNi_{1/3}Mn_{1/3}Co_{1/2}O_2$ (also referred to as NMC, general formula: $LiNi_xMn_yCo_{1-x-y}O_2$ (x>0, y>0, x+y<1)), $Li(Ni_{0.8}Co_{0.15}Al_{0.05})O_2$, and $Li_2MnO_3$—$LiMO_2$(M=Co, Ni, or Mn).

$LiCo_2$ is particularly preferable because of its high capacity, and its stability in the air and thermal stability higher than those of $LiNiO_2$.

Examples of a spinel crystal compound containing lithium and oxygen include $LiMn_2O_4$, $Li_{1+x}Mn_{2-x}O_4$, $Li(MnAl)_2O_4$, and $LiMn_{1.5}Ni_{0.5}O_4$.

It is preferable to add a small amount of lithium nickel oxide ($LiNiO_2$ or $LiNi_{j-x}MO_2$ (M=Co, Al, or the like)) to the spinel crystal compound containing manganese, lithium, and oxygen such as $LiMn_2O_4$, in which case the elution of manganese and the decomposition of an electrolyte solution can be suppressed, for example.

A composite oxide expressed by $Li_{(2-j)}MSiO_4$ (general formula) (M is one or more of Fe(II), Mn(II), Co(II), and Ni(II), 0≤j≤2) can also be used as the positive electrode active material. Typical examples of the general formula $Li_{(2-j)}MSiO_4$ are $Li_{(2-j)}FeSiO_4$, $Li_{(2-j)}NiSiO_4$, $Li_{(2-j)}CoSiO_4$, $Li_{2-j}MnSiO_4$, $Li_{(2-j)}Fe_2Ni_2SiO_4$, $Li_{(2-j)}Fe_kCo_lSiO_4$, $Li_{(2-j)}Fe_2MnSiO_4$, $Li_{(2-j)}Ni_{2-j}Ni_2CoSiO_4$, $Li_{(2-j)}Ni_2Mn_2SiO_4$(k+l≤1, 0<k <1, and 0<l<1), $Li_{(2-j)}Fe_mNi_n(Co_qSiO_4$, $Li_{(2-j)}Fe_mNi_nMn_qSiO_4$, $Li_{(2-j)}Ni_mCo_nMn_qSiO_4$ (m+n+q ≤1, 0<m−1.0<n<1, and 0<q<1), and $Li_{(2-j)}Fe_rNi_sCo_tMn_uSiO_4$ (r+s+t+u ≤1, 0<r<1, 0 <1.0<t<1, and 0<u<1).

Alternatively, a nasicon compound represented by a general formula $A_xM_2(XO_4)_3$ (A=Li, Na, or Mg, M=Fe, Mn, Ti, V, Nb, or Al, X=S, P Mo, W, As, or Si) can be used as the positive electrode active material. Examples of the nasicon compound are $Fe_2(MnO_4)$, $Fe_2(SO_4)_3$, and $Li_3Fe_2(PO_4)_3$. Further alternatively, a compound represented by a general formula $Li_2MPO_4F$, $Li_2MP_2O_7$, or $Li_5MO_4$ (M=Fe or Mn), a pecrovskite fluoride such as $NaF_3$or $FeF_3$, a metal chaleogenide (a sulfide, a selenide, or a ielluride) such as $TiS_2$ or $MoS_2$, a compound containing lithium and oxygen with an inverse spinel crystal structure such as $LiMVO_4$, a vanadium oxide ($V_2O_5$, $V_6O_{13}$, $LiV_3O_8$, or the like), a manganese oxide, an organic sulfur, or the like can be used as the positive electrode active material.

In the case where carrier ions are alkali metal ions other than lithium ions, or alkaline-earth metal ions, the positive electrode active material 404 may contain, instead of lithium in the compound and the oxide, an alkali metal (e.g., sodium or potassium), an alkaline-earth metal (e.g., calcium, strontium, barium, beryllium, or magnesium).

Although not illustrated, a carbon layer may be provided on a surface of the positive electrode active material 404. The carbon layer increases the conductivity of an electrode. The positive elect rode active material 404 can be coated with the carbon layer by mixing a carbohydrate such as glucose at the time of baking the positive electrode active material.

The graphene 405 which is added as a conductive additive to the positive electrode active material layer 402 can be formed by reducing graphene oxide as in the case of producing the negative electrode. Graphene oxide described in Embodiment 1 can be used for the positive electrode active material layer 402.

The length of one side (also referred to as a flake size) of the graphene is greater than or equal to 50 nm and less than or equal, to 100 μm, preferably greater than or equal to 800 nm and less than or equal to 20 μm.

As in the cross-sectional view of the positive electrode active material layer 402 in FIG. 3C, the plurality of positive electrode active material particles 404 are coated with the plurality of graphenes 405. One sheet-like graphene 405 is in contact with the plurality of positive electrode active material particles 404. In particular, since the graphene 405 is in the form of a sheet, surface contact can be made so as to cover part of the surfaces of the positive electrode active material particles 404. Unlike a conductive additive in the form of particles, such as acetylene black, which makes point contact with a positive electrode active material, the graphene 405 is capable of surface contact with low contact resistance; accordingly, the electron conductivity of the positive electrode active material particles 404 and the graphene 405 can be improved without an increase in the amount of conductive additive.

Furthermore, surface contact is made between the plurality of graphenes 405. This is because graphene oxide with exceptional dispersibility in a polar solvent is used for the formation of the graphenes 405. A solvent is removed by evaporation from a polar solvent including graphene oxide uniformly dispersed and the graphene oxide is reduced to graphene; hence, the graphenes 405 remaining in the positive electrode active material layer 402 partly overlap with each other and are dispersed such that surface contact is made, thereby forming an electron conduction path.

Part of the graphene 405 is provided between the positive electrode active material panicles 404. The graphene 405 is art extremely thin film (sheet t made of a single layer of carbon molecules or stacked layers thereof and thus is in contact with part of the surfaces of the positive electrode active material particles 404 so as to trace these surfaces. A portion of the graphene 405 that is not in contact with the positive electrode active material particles 404 is warped between the positive electrode active material particles 404 and crimped or stretched.

Consequently, the plurality of graphenes 405 form an electron conduction network in the positive electrode 400. This maintains a path for electric conduction between the positive electrode active material panicles 404. Thus, when graphene oxide is used as a raw material and reduced after the formation of the electrode, graphene as a conductive additive is produced. Accordingly, the positive electrode active material layer 402 with high electron conductivity can be formed.

The proportion of the positive electrode active material particles 404 in the positive electrode active material layer 402 can be increased because if is not necessary to increase the additive amount of a conductive additive to increase contact points between the positive electrode active material particles 404 and the graphene 405. This can increase the discharge capacity of the lithium-ion secondary battery.

The average diameter of a primary particle of the positive electrode active material particles 404 is less than or equal to 500 nm, preferably greater than or equal to 50 nm and less than or equal to 500 nm. To make surface contact with the plurality of positive electrode active material particles 404, the length of a side of the graphene 405 is preferably greater than or equal to 50 nm and less than or equal to 100 μm, more preferably greater than or equal to 800 nm and less than or equal to 20 μm.

As the binder 406 in the positive electrode active material layer 402, polyvinylidene fluoride (PVDF) is used typically, and polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose, or the like can also be used.

The above positive electrode active material layer 402 preferably includes the positive electrode active material particles 404 at greater than or equal to 00 wt % and less than or equal to 94 wt %, the graphene 405 as a conductive additive at greater than or equal to 1 wt % and less than or equal to 5 wt %, and the binder at greater than or equal to 1 wt % and less than or equal to 5 wt % with respect to the total weight of the positive electrode active material layer 402.

As a separator included in the lithium-ion secondary battery, a porous insulator such as cellulose, polypropylene (PP), polyethylene (PH), polybutene, nylon, polyester, polysulfone, polyacrylonitrile, polyvinylidene fluoride, or tetrafluoroethylene can be used. Alternatively, non woven fabric of a glass fiber or the like, or a diaphragm in which a glass fiber and a polymer fiber are mixed may be used.

The electrolytic solution used in the lithium-ion secondary battery is preferably a nonaqueous solution (solvent) containing an electrolyte (solute).

As a solvent for the electrolytic solution, an aprotic organic solvent is preferably used. For example, one of ethylene carbonate (EC), propylene carbonate (PC), butylene carbonate, cbloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzomtrile, tetrahydrofuran, sulfolane, and sultone can be used, or two or more of these solvents can be used in combination in an appropriate ratio.

When a gelled high-molecular material is used as the solvent for the electrolytic solution, safety against liquid leakage and the like is improved. Furthermore, a thinner and more lightweight lithium-ion secondary battery can be obtained. Typical examples of the gelled high-molecular material include silicone gel, acrylic gel, acrylonitrile gel, polyethylene oxide, polypropylene oxide, and a fluorine-based polymer.

Alternatively, the use of one or more of ionic liquids (room temperature molten salts) that have non-flarnmability and non*volatility as the solvent for the electrolytic solution can prevent a lithium-ion secondary battery from exploding or catching fire even when the lithium-ion secondary battery internally shorts out or the internal temperature increases due to overcharging or the like. Thus, the lithium-ion secondary battery has improved safety. With the use of the ionic liquid as the solvent for the electrolytic solution, the lithium-ion secondary battery can favorably operate even in a low temperature range (sub-zero temperature range) as compared with the case where an organic solvent is used us the solvent for the electrolytic solution.

As an electrolyte dissolved in the above solvent, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$), $LiC(C_3F_4SO_2)_3$), $LiN(CF_3SO_2)_2$, $LiN(C_4F_9SO_2)(CF_3SO_2)$, and $LiN(C_2F_5SO_2)_2$ can be used, or two or more of these lithium salts can be used in combination in an appropriate ratio.

Although lithium ions are used as carrier ions in the above electrolyte, other carrier ions can also be used. When carrier ions other than lithium ions are alkali metal ions or alkaline-earth metal ions, instead of lithium in the above lithium salts, an alkali metal (e.g., sodium or potassium), an alkaline-earth metal (e.g., calcium, strontium, barium, beryllium, or magnesium) may be used for an electrolyte.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator is not necessary. In addition, the battery can be entirely solidified, and thus there is no possibility of liquid leakage to increase the safety of the battery.

Next, a structure of a lithium-ion secondary battery will be described with reference to FIGS. 4A to 4C.

Figure 4A:
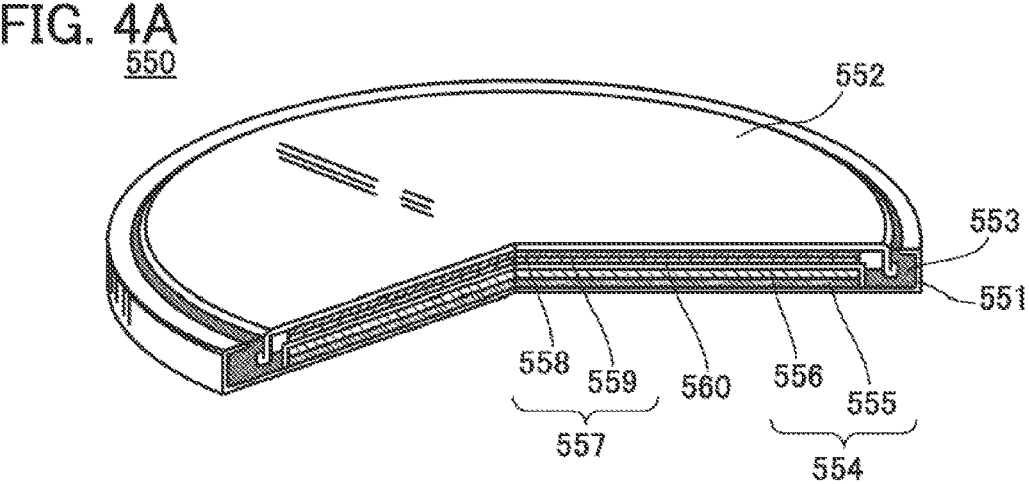
FIGS. 4A to 4C illustrate lithium-ion secondary batteries.

FIG. 4A is an external view of a coin-type (single-layer flat type) lithium-ion secondary battery, part of which illustrates a cross-sectional view of the coin-type lithium-ion secondary battery.

In a coin-type lithium-ion secondary battery 550, a positive electrode can 551 serving also as a positive electrode terminal and a negative electrode can 552 serving also as a negative electrode terminal are insulated and sealed with a gasket 553 made of polypropylene or the like. A positive electrode 554 includes a positive electrode current collector 555 and a positive electrode active material layer 556 which is provided in contact with the positive electrode current collector 555. A negative electrode 557 includes a negative electrode current collector 558 and a negative electrode active material layer 559 which is provided in contact with the negative electrode current collector 558. A separator 560 and an electrolytic solution (not illustrated) are provided between the positive electrode active material layer 556 and the negative electrode active material layer 559.

The negative electrode 557 includes the negative electrode active material layer 559 over the negative electrode current collector 558. The positive electrode 554 includes the positive electrode active material layer 556 over the positive electrode current collector 555.

The positive electrode 554, the negative electrode 557, the separator 560, and the electrolytic solution can be formed using the above described members.

For the positive electrode can 551 and the negative electrode can 552 a mend having corrosion resistance to an electrolytic solution, such as nickel, aluminum, or titanium, an alloy of such a metal, or an alloy of such a metal and another rectal (e.g., stainless steel) can be used. Alternatively, the positive electrode can 551 and the negative electrode can 552 are preferably covered with nickel, aluminum, or the like in order to prevent corrosion caused by the electrolytic solution. The positive electrode can 551 and the negative: electrode can 552 are electrically connected to the positive electrode 554 and the negative electrode 557, respectively.

The negative electrode 557, the positive electrode 554, and the separator 560 are immersed in the electrolytic solution. Then, as illustrated in FIG. 4A, the positive electrode can 551, the positive electrode 554, the separator 560, the negative electrode 557, and the negative electrode can 552 are stacked in this order with the positive electrode can 551 positioned at the bottom, and the positive electrode can 551 and the negative electrode can 552 are subjected to pressure bonding with the gasket 553 interposed therebetween. In such a manner, the coin-type lithium-ion secondary battery 550 is fabricated.

It is preferable that, for example, a graphite electrode (black lead electrode) and lithium iron phosphate (LiFePO$_4$) be used for the negative electrode 557 and an active material of the positive electrode 554 of the lithium-ion secondary battery 550, respectively.

Next, an example of a laminated lithium-ion secondary battery will be described with reference to FIG. 4B. In FIG. 4B, the inside of the laminated lithium-ion secondary battery is partly exposed for convenience.

Figure 4B:
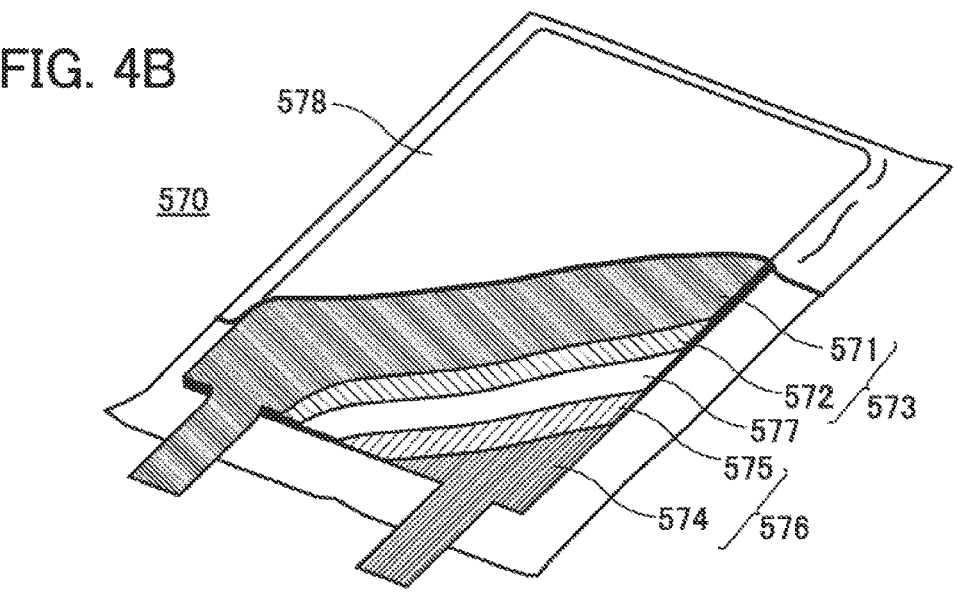
Figure 4C:
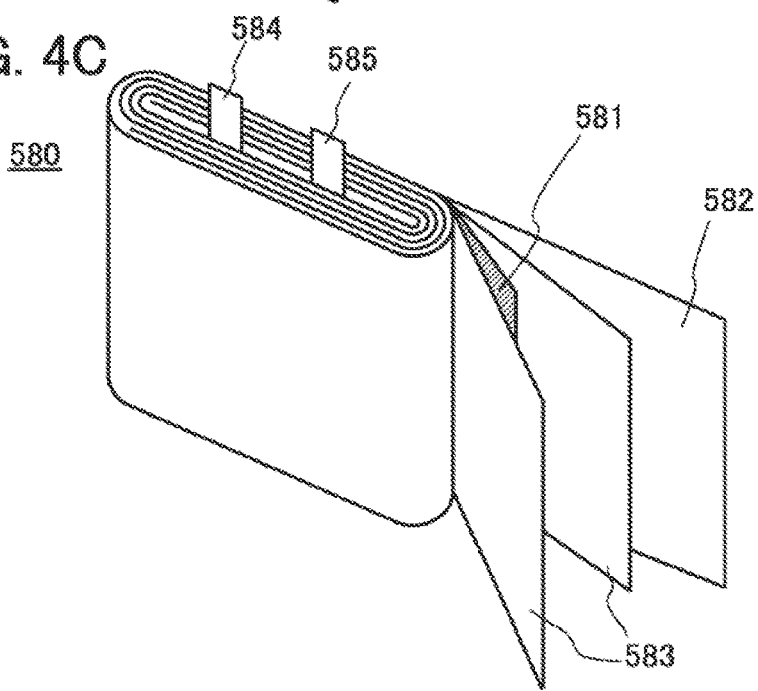

A laminated lithium-ion secondary battery 570 illustrated in FIG. 4B includes a positive electrode 573 including a positive electrode current collet tor 571 and a positive electrode active material layer 572, a negative electrode 576 including a negative electrode current collector 574 and a negative electrode active material layer 575, a separator 577, electrolytic solution (not illustrated), and an exterior body 578. The separator 577 is provided between the positive electrode 573 and the negative electrode 576 in the exterior body 578. The exterior body 578 is filled with the electrolytic solution. Although the one positive electrode 573, the one negative electrode 576, and the one separator 577 are used in FIG. 4B the lithium-ion secondary battery, may have a layered structure in which positive electrodes and negative electrodes are alternately stacked and separated by separators.

The positive electrode, the negative electrode, the separator, and the electrolytic solution (an electrolyte and a solvent) can be formed using the above-described members.

In the laminated lithium-ion secondary battery 570 illustrated in FIG. 4B, the positive electrode current collector 571 and the negative electrode affront collector 574 also serve as terminals tabs) for an electrical contact with an external portion. For this reason, each of the positive electrode cu rent collector 571 and the negative electrode current collector 574 is arranged so as to be partly exposed on the outside of the exterior body 578.

As the exterior body 578 in the laminated lithium-ion secondary battery 570, for example, a laminate film having the following three-layer structure can be used: a highly flexible mend thin film of aluminum, stainless steel, copper, nickel, or the like is provided over a film formed of a material such as polyethylene, polypropylene, polycarbonate, ionomer, polyamide, and an insulating synthetic resin film of a polyaramde-based resin, a polyester-based resin, or the like is provided as the outer surface of the exterior body over the metal thin film. With such a three-layer structure, permeation of the electrolytic solution and a gas can be blocked and an insulating property and resistance to the electrolytic solution can be obtained.

Next, an example of a rectangular lithium-ion secondary battery will be described with reference to FIG. 4C. A wound body 580 illustrated in FIG. 4C includes a negative electrode 581, a positive electrode 582, and a separator 583. The wound body 580 is obtained by winding a sheet of a stack in which the negative electrode 581 overlaps with the positive electrode 582 with the separator 583 provided therehetween. The wound body 580 is covered with a rectangular sealing can or the like, thus, a rectangular lithium-ion secondary battery is fabricated. Note that the number of stacks each including the negative electrode 581, the positive electrode 582, and the separator 583 may be determined as appropriate depending on required capacity and the volume of a battery.

As in a cylindrical lithium-ion secondary battery, the negative electrode 581 is connected to a negative electrode lab (not illustrated) through one of a terminal 584 and a terminal 585, and the positive electrode 582 is connected to a positive electrode tab not illustrated) through the other of the terminals 584 and 585.

Although the coin-type, laminated, and rectangular lithium-ion secondary batteries are described above, lithium-ion secondary batteries with other variety of shapes can also be used. Furthermore, a plurality of positive electrodes, a plurality of negative electrodes, and a plurality of separators may be stacked or wound.

By using the electrode for a lithium-ion secondary battery of one embodiment of the present invention as the negative electrode of the lithium-ion secondary battery, the capacity of the lithium-ion secondary battery cart be increased.

The electrode (negative electrode) for a lithium-ion secondary battery of one embodiment of the present invention uses silicon and therefore has large capacity. Accordingly, the thickness the negative electrode active material layer can be reduced to increase the thickness of the positive electrode active material layer. In other words, the amount of positive electrode active material can be increased, resulting in an increase in the energy density of the lithium-ion secondary battery.

This embodiment can be implemented in appropriate combination with any of the other embodiments.

Embodiment 3

The lithium-ion secondary battery of one embodiment of the present invention can be used for power supplies of a variety of electric devices operated with electric power.

Specific examples of electric devices each utilizing the lithium-ion secondary battery of one embodiment of the present invention are as follows: display devices of televisions, monitors, and the like, lighting devices, desktop personal computers and laptop personal computers, word processors, image reproduction devices which reproduce still images or moving images stored in recording media such as digital versatile discs (DVDs), portable compact disc (CD) players, radio receivers, tape recorders, headphone stereos, stereos, clocks such as table clocks and wall clocks, cordless phone handsets, transceivers, cellular phones, ear phones, portable game machines, calculators, portable information terminals, electronic notebooks, e-hook readers, electronic translators, audio input devices, cameras such as digital still cameras and video cameras, toys, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers dishwashers, dish dryers, clothes dryers futon dryers, electric refrigerators, electric freezers, electric refrigerator-freezers, freezers for preserving DNA, flashlights, electric power tools such as chain saws, smoke detectors, and medical equipment such as dialyzers. Further examples are as follows: industrial equipment such as guide lights, traffic lights, belt conveyors, elevators, escalators, industrial robots, power storage systems, and power storage devices for leveling the amount of power supply and smart grid. In addition, moving objects driven by electric motors using electric power from the lithium-ion secondary batteries are also included in the category of electric devices. Examples of the moving objects include electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircraft, rockets, artifical satellites, space probes, planetary probes, and spacecrafts.

In the electric devices, the lithium-ion secondary battery of one embodiment of the present invention can be used as a main power supply for supplying enough electric power for almost the whole power consumption. Alternatively, in the electric devices, the lithium-ion secondary battery of one embodiment of the present invention can be used as an uninterruptible power supply which can supply electric power to the electric devices when the supply of electric power from the main power supply or a commercial power supply is stopped. Still alternatively, in the electric devices, the lithium-ion secondary battery of one embodiment of the present invention can be used as an auxiliary power supply for supplying electric power to the electric devices at the same time as the power supply from the main power supply or a commercial power supply.

A portable terminal which is an example of electric devices is described with reference to FIGS. 5A to 5C.

Figure 5A:
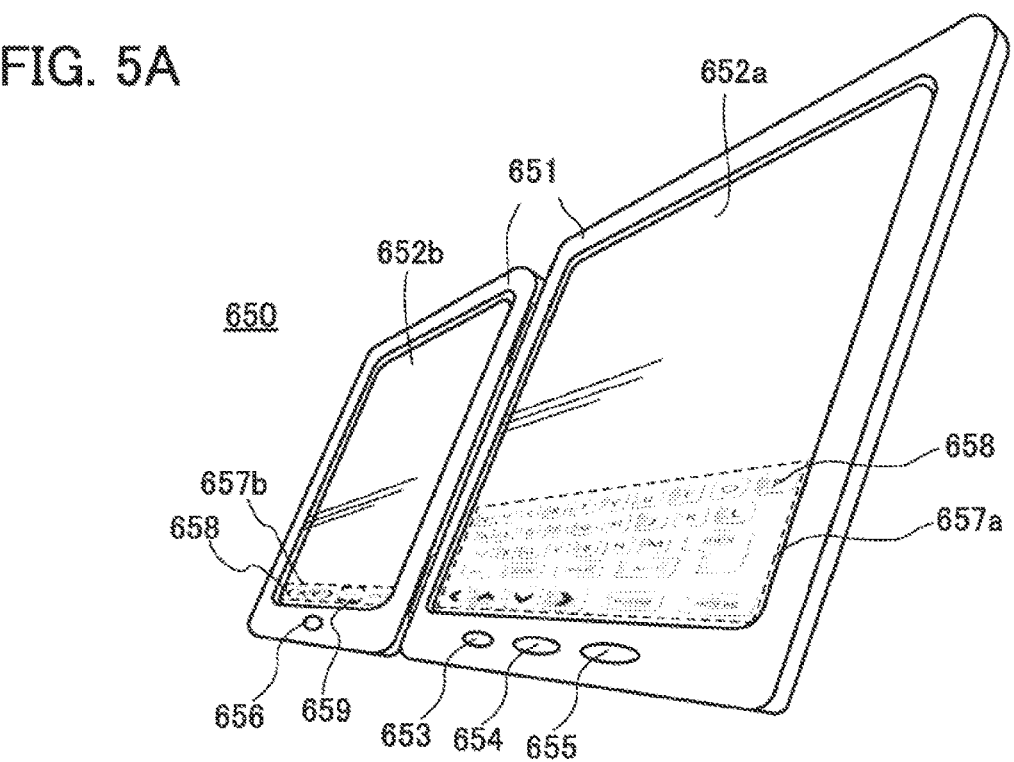
FIGS. 5A to 5C illustrate an electric device.
Figure 5B:
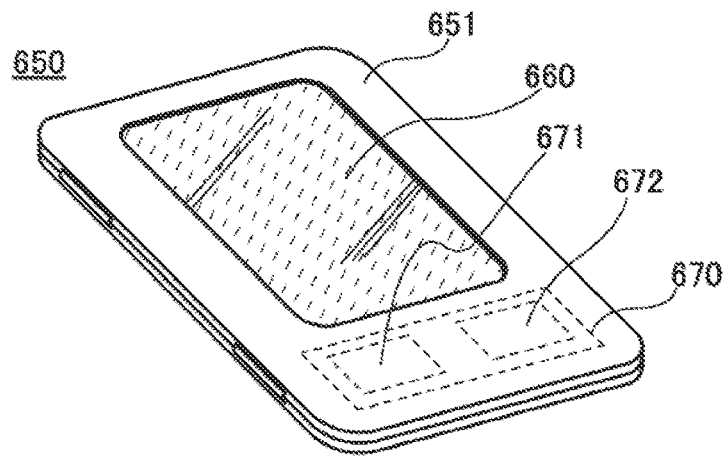

FIGS. 5A and 5B illustrate a foldable tablet terminal 650. FIG. 5A illustrates the tablet terminal unfolded. The tablet terminal 650 includes a housing 651, a display portion 652a, a display portion 652b, a display mode switching button 653, a power switch 054, a power-saving mode switching button 655 and an operation switch 656.

Part of the display portion 652a can be a touch panel area 657a, and data can be input by touching operation keys 658 displayed. Although a half region in the display function, the display portion 652a is not limited to this structure. The whole region in the display portion 652a may have a touch panel function. For example, the display portion 652a can display keyboard buttons in the whole region to be a touch panel, and the display portion 052b can be used as a display screen.

A touch panel area 057b can be provided in part of the display portion 652b like in the display portion 652a. When a keyboard display switching button 659 displayed on the touch panel is touched with a finger, a stylus, or the like, a keyboard can be displayed on the display portion 651b.

Both the touch panel area 657a and the touch panel area 657b can be controlled by touch input at the same time.

A semiconductor display device such as a liquid crystal display device, a light-emitting device including pixels each provided with a light-emitting element such as an organic EL element, an electrophoresis display device, a digital micromirror device (DMD), a plasma display panel (PDP), or a field emission display (FED) can be used for the display portions 652a and 65b.

The display mode switching button 653 allows switching between a landscape mode and a portrait mode, or between color display and black-and-white display. For example. The power-saving mode switching button 655 allows optimizing the display luminance in accordance with the amount of external light in use which is detected by an optical sensor incorporated in the tablet terminal. In addition to the optical sensor, other detecting devices such as sensors for determining inclination, such as a gyroscope or an acceleration sensor, may be incorporated in the tablet terminal.

Although the display portions 652a and 652b have the same display area in FIG. 5A, one embodiment of the present invention is not particularly limited thereto. The display portions 652a and 652b may have different display areas, and may also have different display qualities. For example, one of the display portions 652a and 652b may display higher definition images than the other.

FIG. 5B illustrates the tablet terminal 650 closed. The tablet terminal 650 includes the housing 651, a solar cell 660, a charge/discharge control circuit 670, a battery 671, and a DC-DC converter 672. In FIG. 5B, the charge/discharge control circuit 670 includes the battery 671 and the DC-DC converter 672 as an example. The lithium-ion secondary battery described in the above embodiments is used as the battery 671.

Since the tablet terminal 650 can be folded, the housing 651 can be closed when the tablet terminal is not in use. Thus, the display portions 652a and 652b can be protected, which permits the tablet terminal 650 to have high durability and improved reliability for long-term use.

The tablet terminal illustrated in FIGS. 5A and 5B can also have function of displaying various kinds of data (e.g., a still image, a moving image, and a text image), a function of displaying a calendar, a date, the time, or the like on the display portion, a touch-input, a function of operating or editing data displayed on the display portion by touch input, a function of controlling processing by various kinds of software (programs), and the like.

The solar cell 660, which is attached on a surface of the tablet terminal, can supply electric power to a touch panel, a display portion, an image signal processor, and the like. Note that the solar cell 660 can be provided on one or both surfaces of the housing 651 and thus the battery 671 can be charged efficiently. The use of the lithium-ion secondary battery of one embodiment of the present invention as the battery 671 has advantages such as a reduction in size.

The structure and operation of the charge/discharge control circuit 670 illustrated in FIG. 5B will be described with reference to a block diagram of FIG. 5C. FIG. 5C illustrates the solar cell 660, the battery 671, the DC-DC converter 672, a converter 673, switches SW1 to SW3, and the display portion 652. The battery 671, the DC-DC converter 672, the converter 673, and the switches SW1 to SW3 correspond so the charge/discharge control circuit 670 in FIG. 5B.

First, an example of the operation where electric power is generated by the solar cell 600 using external light will be described. The voltage of electric power generated by the solar cell 660 is raised or lowered by the DC-DC converter 672 so that the electric power has a voltage for charging the batter 671. When the display portion 652 is operated with the electric power from the solar cell 660, the switch SW1 is turned on and the voltage of the electric power is raised or lowered by the converter 673 to a voltage needed for operating the display portion 652. When display on the display portion 652 is not performed, the switch SW1 is turned off and the switch SW2 is turned on so that the battery 671 may be charged.

Although the solar cell 600 is described as an example of a power generation means, there is no particular limitation on the power generation means, and the battery 671 may be charged with any of the other means such as a piezoelectric element or a thermoelectric conversion element (Peltier element). For example, the battery 671 may be charged with a non-contact power transmission module capable of performing charging by transmitting and receiving electric power wirelessly (without contact), or any of the other charge means used in combination.

Figure 5C:
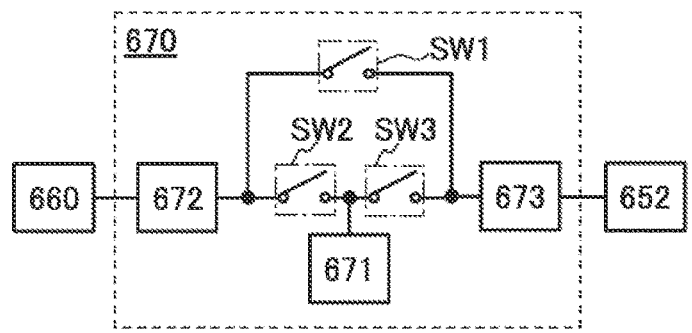

It is needless to say that one embodiment of the present invention is not limited to the electric device illustrated in FIGS. 5A to 5C as long as the electric device is equipped with the lithium-ion secondary battery described in the above embodiments.

Example 1

In this example, the electrode for a lithium-ion secondary battery shown in Embodiment 1 was fabricated and observed by scanning electron microscope (SEM). Then, the charge-discharge characteristics of a half-cell including the electrode were measured to obtain the charge-discharge efficiency of the half-cell.

The lithium-ion secondary battery used in this example was fabricated by the method shown in the flowchart of FIG. 1.

In this example, a negative electrode includes a negative electrode current collector made of 18-μm-thick copper foil. Silicon particles (with an average diameter of 60 nm) as a negative electrode active material, graphene oxide as a conductive additive, and a polyimide precursor as a binder were mixed at a ratio of 40:40:20 (weight %). More specifically, 0.12 g of silicon panicles, 0.12 g of graphene oxide, and 0.2 g of undiluted polyimide were mixed. Note that the undiluted polyimide used in this example contains 30 wt % of solid content (polyimide precursor) and 70 wt % of solvent (NMP). Therefore, the weight of polyimide imidized after a heating process is 0.06 g (0.2 g×0.3). The mixture of the polyimide precursor and NMP has a pH of approximately 3.

As shown in step S11 in FIG. 1, the active material, the binder, and graphene oxide were mixed to prepare slurry. The slurry was prepared in the following manner: first, silicon panicles and NMP as a polar solvent were mixed; next, graphene oxide and NMP were added to the mixture of silicon particles and NMP; then, a polyimide precursor was added to the mixture of silicon particles, graphene oxide, and NMP; lastly, NMP was added to that mixture until the mixture has predetermined viscosity and NMP and the mixture were mixed. After that, the slurry was left in the air for a day (approximately 24 hours).

Then, as shown in step S12, the prepared slurry was applied to copper foil. The application of the slurry was performed in the following manner: copper foil was set in a coating device and slurry was dropped onto the copper foil; then, a doctor blade (with a gap of 100 μm) was placed in the point where the slurry was dropped and the blade was moved by the coating device.

Next, as shown in step S13, the slurry was dried. The copper foil coated with the slurry was set in a forced-air dryer and dried at 80° C. for two hours. In this manner, an electrode with the dried slurry was obtained.

Then, as shown in step S14, the electrode with the dried slurry was baked in a vacuum furnace. The temperature in the vacuum furnace started to increase after the degree of vacuum in the vacuum furnace reached $2\times10^{-2}$ [Pa].

The electrode the dried slurry was baked at temperatures gradually increasing to the maximum temperature of the vacuum furnace. First, the temperature was raised from room temperature to 120° C. and baking was performed for one hour; then, the temperature was raised from 120 to 200° C. and baking was performed for 10 minutes; next, the temperature was raised from 200° C. to 250° C. and baking was performed for one hour; lastly, the temperature was raised from 250° C. 372° C. and baking was performed for 30 minutes. Note that the degree of vacuum in the vacuum furnace reached approximately $1\times10^{-6}$ [Pa] in the baking.

Figure 6:
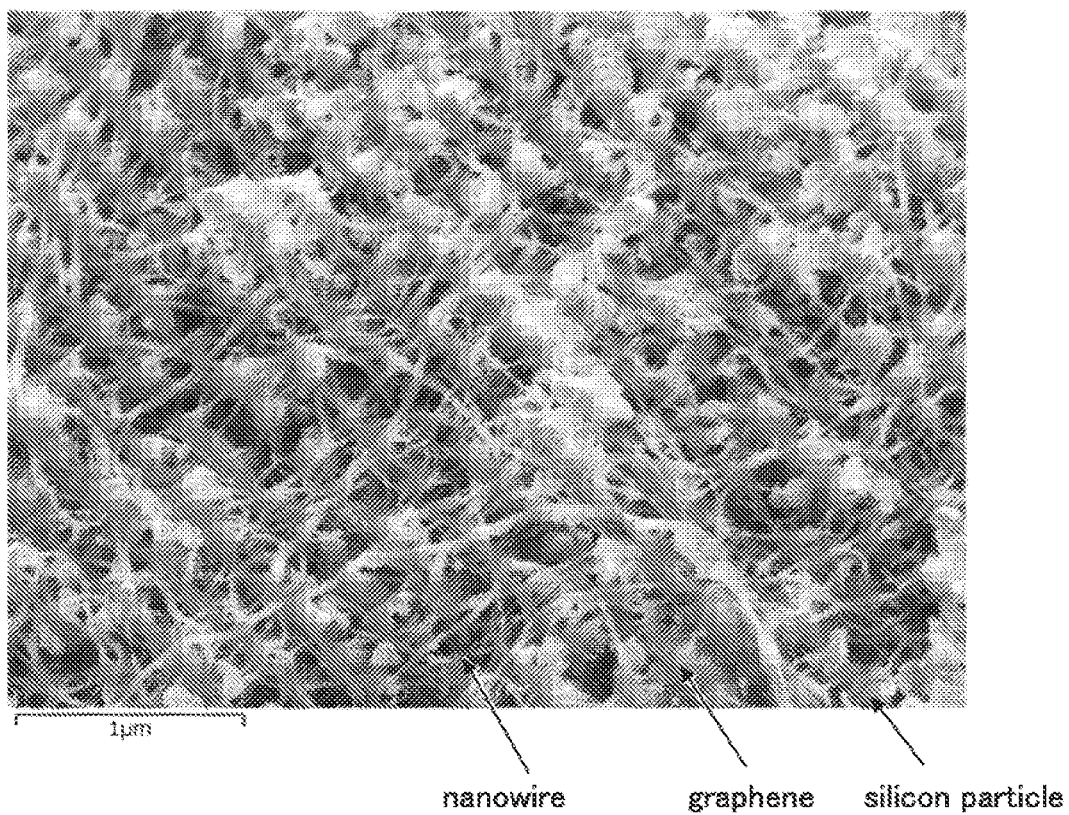
FIG. 6 is a SEM photograph of an electrode for a lithium-ion secondary battery.

The electrode that had been baked was observed by SEM. FIG. 6 shows a SEM photogram of the electrode fabricated in this example.

The SEM photograph of FIG. 6 shows that a nanowire grows with a silicon particle used as a nucleus and extends in one direction into a fine needle. Nanowires are tangled, so that a network of nanowires is obtained. Furthermore, graphene is formed over the tangled nanowires. The graphene has a planar shape, and thus the surface contact with the tangled nanowires was observed.

The photograph of FIG. 6 indicates that the electrode for a lithium-ion secondary battery of one embodiment of the present invention can be fabricated.

Next, a half-cell was produced using the electrode of this example. The measurement results of the charge-discharge characteristics and charge-discharge efficiency of the half-cell will be described.

The half-cell produced in this (this example includes metal lithium as a positive electrode and the electrode produced in this example as a negative electrode. In the fabrication of the half-cell manufactured by NIPPON TOMUSERU was used.

An electrolyte solution was formed by dissolving lithium hexafluorophosphate ($LiPF_6$) in a solution where ethylene carbonate (EC) and diethyl carbonate (DEC) were mixed at a ratio of 1:1. As a separator, polypropylene was used.

The charge-discharge characteristics of the half-cell produced in this example were measured in the following conditions. Charge and discharge in the first cycle were performed at a rate of 0.1 C (it takes 10 hours for charging), and charge and discharge in the second and the subsequent cycles were performed at a rate of 1 C (it takes 1 hour for charging). In every 20 cycles, charge and discharge were performed at a rare of 0.1 C (it takes 10 hours for charging). The charge and discharge were performed 180 cycles to measure the discharge rapacity. The charge and discharge were performed with a constant current at voltages ranging flora 0 V to 1 V and an environmental temperature of 25° C.

The charge-discharge efficiency was obtained From the charge-discharge characteristics of the half-cell; as a result, the charge-discharge efficiency in 180-cycle charge and discharge was found to be 99.22 on average. This is probably because the nanowires prevented a decrease in the charge-discharge characteristics due to silicon deformation and breakage.

The above results revealed that the electrode for a lithium-ion secondary battery of one embodiment of the present invention had high reliability and that a lithium-ion battery including the electrode had improved charge-discharge efficiency.

This application is based on Japanese Patent Application serial No. 2013-166809 filed with Japan Patent Office on Aug. 9, 2013 the entire contents of which are hereby incorporated by reference.

What is claimed is:

1. A method for manufacturing a lithium-ion storage battery comprising:
   providing a negative electrode adjacent to a positive electrode,
   wherein the positive electrode comprises a positive electrode current collector and a positive electrode active material layer,
   wherein the negative electrode comprises a negative electrode current collector and a negative electrode active material layer,
   wherein the negative electrode active material layer comprises silicon particles and a binder,
   wherein a silicon wire is formed from a first part of the silicon particles by heating after forming the negative electrode active material layer,
   wherein the silicon particles have an average diameter of 10 nm to 1 um before the heating, and
   wherein a thickness of the negative electrode active material layer is smaller than a thickness of the positive electrode active material layer.

2. A method for manufacturing a lithium-ion storage battery comprising:
   providing a negative electrode adjacent to a positive electrode,
   wherein the positive electrode comprises a positive electrode current collector and a positive electrode active material layer,
   wherein the negative electrode comprises a negative electrode current collector and a negative electrode active material layer,
   wherein a method for manufacturing the negative electrode active material layer comprises:
      mixing a first mixture comprising silicon particles and graphene oxide, a polyimide precursor and a solvent to form a slurry; and
      applying the slurry over the negative electrode current collector and heating,
   wherein the heating forms a nanowire using a first part of the silicon particles, reduces the graphene oxide to graphene, and imidizes the polyimide precursor to polyimide, and
   wherein the nanowire grows with a second part of the silicon particles used as a nucleus and extends into a needle by the heating.

3. The method for manufacturing the lithium-ion storage battery according to claim 1,
   wherein the binder is polyimide,
   wherein a precursor of polyimide is used for forming the negative electrode active material layer, and
   wherein the precursor of polyimide is imidized by the heating.

4. The method for manufacturing the lithium-ion storage battery according to claim 1, wherein the silicon wire has a length of ten micrometers or more.

5. The method for manufacturing the lithium-ion storage battery according to claim 1, wherein a second part of the silicon particles forms a first aggregated object by the heating.

6. The method for manufacturing the lithium-ion storage battery according to claim 5, wherein the silicon wire grows with the first aggregated object as a nucleus.

7. The method for manufacturing the lithium-ion storage battery according to claim 6,
   wherein a third part of the silicon particles forms a second aggregated object by the heating, and
   wherein the silicon wire is attached to the second aggregated object after the heating.

8. The method for manufacturing the lithium-ion storage battery according to claim 1, wherein the heating is performed at a temperature equal to or less than 400° C.

9. The method for manufacturing the lithium-ion storage battery according to claim 1, wherein the heating is performed at a temperature equal to or greater than 360° C. and equal to or less than 400° C.

10. The method for manufacturing the lithium-ion storage battery according to claim 1, wherein the negative electrode active material layer comprises a conductive additive.

11. The method for manufacturing the lithium-ion storage battery according to claim 1, wherein the negative electrode active material layer comprises graphene and polyimide.

12. The method for manufacturing the lithium-ion storage battery according to claim 1, wherein the positive electrode active material layer comprises graphene and polyvinylidene fluoride.

13. The method for manufacturing the lithium-ion storage battery according to claim 2, wherein a thickness of the negative electrode active material layer is smaller than a thickness of the positive electrode active material layer.

14. The method for manufacturing the lithium-ion storage battery according to claim 2, wherein the silicon particles have an average diameter of 10 nm to 1 μm before the heating.

15. The method for manufacturing the lithium-ion storage battery according to claim 2, wherein the nanowire has a length of ten micrometers or more.

16. The method for manufacturing the lithium-ion storage battery according to claim 2, wherein the heating is performed at a temperature equal to or greater than 360° C. and equal to or less than 400° C.

17. The method for manufacturing the lithium-ion storage battery according to claim 2, wherein the positive electrode active material layer comprises graphene and polyvinylidene fluoride.

* * * * *